March 31, 1970  R. J. KAVANAUGH  3,504,253
ROTARY STEPPING MOTOR HAVING A D-C WINDING AND A PULSED WINDING
Original Filed June 4, 1965
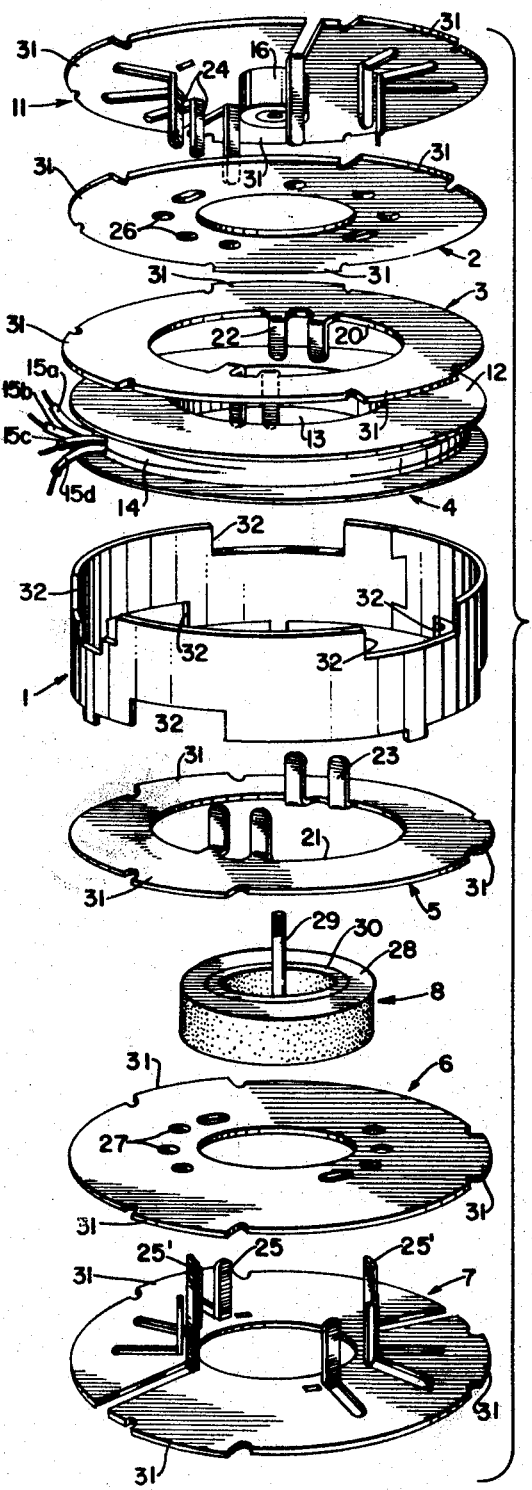
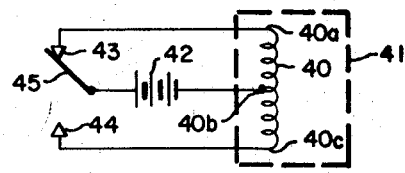
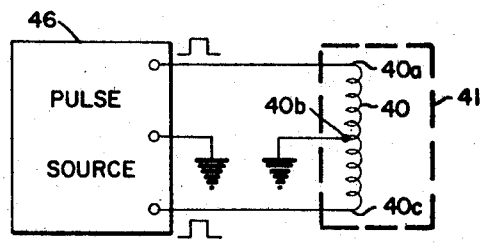
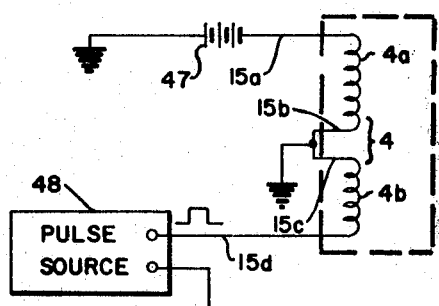
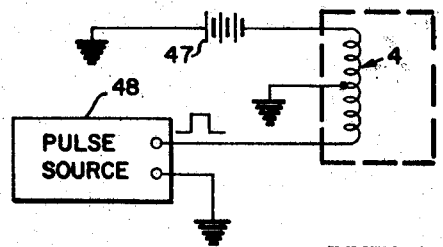
INVENTOR.
RICHARD J. KAVANAUGH
ATTORNEY United States Patent Office 3,504,253
Patented Mar. 31, 1970

3,504,253
ROTARY STEPPING MOTOR HAVING A D-C WINDING AND A PULSED WINDING
Richard J. Kavanaugh, Bristol, Conn., assignor to Consolidated Electronics Industries Corp., New York, N.Y., a corporation of Delaware
Continuation of application Ser. No. 461,368, June 4, 1965. This application Dec. 9, 1968, Ser. No. 782,213
Int. Cl. H02p 1/18; H02k 37/00
U.S. Cl. 318—138                9 Claims

ABSTRACT OF THE DISCLOSURE

A stepper motor having a permanent magnet rotor and a clawtooth stator with two coils or coil sections, one coil supplied continuously with direct current and the other coil with current pulses to produce in the stator a magnetic field that more than overcomes the field produced by the direct current to cause the motor to step forward each time one of the pulses is applied.

This is a continuation of application Ser. No. 461,368, filed on June 4, 1965, now abandoned.

BACKGROUND OF THE INVENTION

Field of the invention

The present invention relates, in general, to stepper motors and, in particular, to a new mode of operation of stepper motors.

Many stepper motors are actually modified A-C timing motors. Alternating current motors with permanent-magnet rotors contain an inherent position reference of the rotor to the stator. When used as an A-C motor, the rotor uses this reference to follow the rotating poles created by the alternating current. Actually, the rotor is indexing at a constant (synchronous) rate in response to voltage reversals of the sinusoidal A-C input. When used as a stepper motor, the situation is identical except that the rate is not necessarily constant, and the input is either square wave or D-C pulses.

Various stepping mechanisms are now called stepper motors. These can be generally classified as mechanical or magnetic. Mechanical types include rotary solenoids, ratchet-wheel solenoids, rotary-output relays, and escape-wheel drive systems. Magnetic types are motors by design, with electrical modifications in some cases to permit the desired operation.

Basically, a stepper motor is a device which responds to random D-C square wave pulses. The principle has been applied to relay devices for many years, and more recently motors have been developed along the same basis. The most recent introductions have been inductor-type motors which will respond to square waves. One type with which the present invention is concerned can actually be used in sinusoidal alternating current or square wave direct current.

A typical stepper motor consists of a modified inductor-type motor with a center-tapped winding. One mode of operation of such a motor is to connect the center tap to a current source having one polarity and apply the opposite polarity to the ends of the winding alternately. This produces rotation the same as if an alternating signal were impressed across the entire winding. The required signals may be developed a number of ways. For example, a battery having its negative terminal connected to the center tap, may have its positive terminal switched between the ends of the winding by means of a single-pole, double-throw switch. Alternatively, the center tap may be grounded and the ends of the winding individually connected to a push-pull pulse source or to two different pulse sources. The ends of the winding are pulsed alternately by proper timing adjustments of the pulse sources. The duration of the pulses or the time the switch is held at one end of the winding is of no concern as long as certain minimums are met.

The present invention contemplates another mode of operation of a stepper motor. It results in a simplification of the control circuitry for the motor.

Accordingly, it is an object of the present invention to provide a new and improved stepper motor.

It is another object of the present invention to provide a new and improved stepper motor which utilizes a control circuit of simple reform and operation to the control circuits heretofore used for stepper motors.

A stepper motor constructed in accordance with the present invention includes a stator having a plurality of poles and a two-part field coil. Also included are a rotor and means for connecting one end of each of the parts of the field coil to a reference potential. The stepper motor of the invention further includes means for applying a steady D-C signal to the free end of one of the parts of the field coil and means for applying a series pulses to the free end of the second of the parts of the field coil to produce, in effect, a stepwise rotating magnetic field in the stator poles.

BRIEF DESCRIPTION OF THE DRAWINGS

For a better understanding of the present invention, together with other and further objects thereof, reference is had to the following description, taken in connection with the accompanying drawing, and its scope will be pointed out in the appended claims.

Referring to the drawing:

FIG. 1 is an exploded view, in perspective, of the stator and rotor portions of a stepper motor constructed in accordance with the present invention;

FIGS. 2a and 2b are schematic diagrams of circuits for effecting two well-known modes of operation of stepper motors;

FIG. 3 is a schematic diagram of one embodiment of a new mode of operation of a stepper motor in accordance with the present invention; and FIG. 4 is a schematic diagram of a second embodiment of a new mode of operation of a stepper motor in accordance with the present invention.

DESCRIPTION OF THE PREFERRED EMBODIMENTS

Referring to FIG. 1, a stepper motor constructed in accordance with the present invention includes a stator having a plurality of poles 22, 23, 24 and 25 and a two-part field coil 4. Specifically, this stator, which is similar to that in U.S. Patents 2,981,855 and 3,014,141, is composed of a pair of pole assemblies disposed on either side of the field coil 4. The pole assembly positioned above the field coil 4 comprises a magnetic metallic unshaded pole member 3, a non-magnetic metallic shading ring 2, and a magnetic metallic shaded pole member 11. The pole assembly positioned below the field coil 4, comprises a magnetic metallic unshaded pole member 5, a non-magnetic shading ring 6, and a magnetic metallic shaded pole member 7. Shaded pole members 11 and 7 also serve as end walls. A housing 1, having cut-outs adapted to receive the pole members 3, 5, 7, 11, the shading rings 2, 6 and the field coil 4 provides a closure and support for entire structure.

The two-part field coil 4 is made up of a form 12 of molded plastic material having a central aperture 13. The coil may be bobbin wound onto the form 12 so that the winding 14 ends up with a rectangular cross-section. Energizing leads 15a, 15b, 15c, and 15d are provided.

Additional details about the field coil 4 will be provided below in connection with FIG. 3.

The poles 22, 23, 24, and 25 are carried by the unshaded pole member 3, the unshaded pole member 5, the shaded pole member 11, and the shaded pole member 7, respectively. Specifically, there are fixed to the inner peripheries 20 and 21 of the members 3 and 5, respectively, the poles 22 and 23 which extend normally from the plane of these members. In general, poles 22 and 23 are so located and are of such length that when the members 3 and 5 are assembled on the coil 4, the poles 22 and 23 will interlace each other. Thus, there will be spaced around the surface of the coil aperture 13 alternately a pole 22 and then a pole 23 followed by another pole 22 and another pole 23.

As to the poles 24 and 25, in each case the poles are attached to the shaded pole members at one end and extend normally from the plane thereof. They are spaced about the circumference of a circle which has a diameter substantially the same as the diameter of the aperture 13 in the coil 4. The poles 24 and 25 are also spaced in such a manner that in the assembled motor they pass through openings 26 and 27, respectively, in shading rings 2 and 6, respectively, and interlace with each other.

The stepper motor of the invention also includes a rotor 8 that is similar to the rotor in U.S. Patent 2,981,855. Rotor 8 may comprise an annulus 28, a shaft 29, and a hub 30 for securing the annulus to the shaft. The annulus 28 may be of any suitable material which can be permanently magnetized. Pairs of diametrically opposed poles of the rotor are induced in the periphery by any suitable means and are preferably evenly spaced apart, adjacent poles being of opposite polarity.

To assist in the alignment of the various components, orientation tongues are provided in the outer periphery of the shading rings 2 and 6 and in each of the pole members 3 and 5, as well as in the outer periphery of the shaded pole members 7 and 11. In all cases, these tongues have been designated by the reference numeral 31. The tongues 31 fit into corresponding cut-outs 32 in the housing 1. The tongues 31 and the cut-outs 32 are precisely oriented to insure that the poles on members 11, 3, 5, and 7 are properly interlaced and spaced with respect to each other in the assembled motor.

In the assembled position, the rotor annulus 28 fits into the aperture 13 in the field coil 4. A suitable bearing 16, affixed to the end wall 11, is provided for the shaft 29 of rotor 8.

The mode of construction of many prior stators has required that the unshaded poles be arranged or distorted to attenuate the unshaded flux which the stator is capable of producing to achieve a balance between the effective shaded and unshaded fluxes. On the other hand, the pole arrangement shown in FIG. 1 includes more shaded than unshaded poles to obtain more nearly equal effective fluxes acting on the rotor. Moreover, additional control is exercised over the balance of the shaded and unshaded fluxes by making one of the poles in each of the shaded pole groups substantially longer than the others so that it may be utilized as a flux shunt. In FIG. 1 these shunt poles have been given the reference numeral 25'. The exact length of these shunting poles will be determined in a motor or particular size by experiment. It may be necessary to extend the poles into physical contact with the opposite shaded pole member, here pole member 11, in which case the shunt will have relative low reluctance. On the other hand, it may be found sufficient to extend the lengths of the shunt poles only enough to close the air gaps at the ends by some small amount, thereby lowering the reluctance of the flux paths through the shunt poles.

Referring to FIGS. 2a and 2b, there are shown circuits for effecting two well-known modes of operation of stepper motors. In FIG. 2a, the field coil 40 of the motor 41 has a center tap 40b connected to the negative terminal of a battery 42. The positive terminal of the battery 42 is alternately connected between a terminal 43 and a terminal 44 through a switch blade 45. The effect of this action is to connect the positive terminal of the battery 42 alternately to the opposite ends 40a and 40c of the field coil 40. As stated above, this produces rotation of the rotor the same as if an alternating signal were connected to the opposite ends of the field coil 40 and impressed across the entire winding. The rotor moves one increment, or step, for each connection of the switch blade 45 to either of the terminals 43 or 44.

In FIG. 2b, which may be considered the pure electrical analog for the electro-mechanical arrangement of FIG. 2a, the center tap 40b of the field coil 40 is grounded and a pulse source 46 is connected to the ends 40a and 40c of the field coil. Although shown as a single unit, pulse source 46 provides two trains of pulses which are time displaced. This may be accomplished through the use of two separate pulse generators or a signal pulse generator with suitable delay mechanism. The effect of the pulses from the pulse source 46 in being supplied alternately to the two ends of the field coil 40 is, like the apparatus of FIG. 2a, to produce rotation of the stator the same as if an alternating signal were connected to the ends of the field coil 40 and impressed across the entire winding. The rotor moves one increment or step for each pulse supplied by the pulse source 46.

Referring to FIG. 3, which is a schematic diagram of one embodiment of a new mode of operation of stepper motors according to the present invention, the field coil 4 is seen to be composed of two parts 4a and 4b. In this embodiment, the parts 4a and 4b are entirely separate windings, although, as will be brought out below, the two-part field coil may be formed of a single winding divided into two parts by a tap at an appropriate turn. One end of each of the windings 4a and 4b is connected to a reference potential, in this case ground, through the leads 15b and 15c. The winding 4a is seen to have a greater number of turns than the winding 4b. The reason for this will also be explained below.

Also included in the stepper motor of the invention are means for applying a steady D-C signal to the free end of the one of parts of the field coil 4. This may include a D-C signal source, such as a battery 47, having its negative terminal connected to the free end of the winding 4a through the lead 15a and its negative terminal grounded. It is seen that battery 47 is connected to that part 4a of the field coil 4 having the greater number of turns. The steady D-C signal from the battery 47 is effective to establish a first magnetic field which causes the rotor to move one increment or step.

The stepper motor of the invention further includes means for applying a series of pulses to the free end of the second part of the field coil 4. This may include a pulse source 48, having its output terminal connected to the free end of the winding 4b through the lead 15d. It is seen that pulse source 48 is connected to that part 4b of field coil 4 having the lesser number of turns.

The pulse source 48 may be any conventional pulse generator, either free running for certain applications or triggered for other application. The amplitude of the pulses to be generated is determined by the relative number of turns of the winding 4a and 4b, the wire sizes of these windings and the magnitude of the voltage of battery 47. All these parameters, along with the amplitude of the pulses, are interdependent in establishing a second magnetic field, which lasts for the duration of each of the pulses and is opposed to and greater than the first magnetic field. The result is a net magnetic field in the opposite direction which causes the rotor to move another increment in the original direction of movement.

The most efficient operation of the stepper motor of the invention will be obtained if the pulsed coil 4b provides twice the ampere turns of the coil 4a to which the D-C battery 47 is connected. The minimum ampere turns for the coil 4a would be determined by the amount of torque necessary to move the rotor forward plus the amount of ampere turns necessary to overcome the hysteresis of the stator. In addition, a safety factor is desirable so that the coil 4a would have more than the bare minimum number of ampere turns. The minimum ampere turns for the coil 4b would be determined by the same factors in addition to the actual ampere turns of the coil 4a which have to be overcome.

The battery 47 is merely intended to be representative of the type of component capable of providing a steady D-C signal. Normally, the coil 4a would be connected to a low impedance D-C power supply of conventional construction and operation. The coil 4b might also be connected to the same power supply through a transistor pulse circuit. Because of the additional impedance of the transistor pulse circuit, the pulses supplied to the coil 4b would be slightly smaller in amplitude than the magnitude of the D-C signal supplied to the coil 4a. If this arrangement were employed, this difference between the magnitude of the D-C signal applied to coil 4a and the amplitude of the pulses applied to coil 4b would have to be taken into consideration in the selection of values of the parameters in order to establish magnetic fields of proper magnitude.

Since the field coil 4 is shown as being composed of two entirely separate windings, it is practical to use a first wire size for one winding and a second wire size for the second winding, thereby establishing another degree of control over the relative ampere turns of the two windings. The wire size, like the wire length, has a bearing on the resistance of the wire which, in turn, has a bearing on the magnitude of the current flowing through the winding. The total ampere turns is, therefore, dependent upon the wire size and the number of turns.

Assuming that a low impedance power supply is connected, in the manner described above, to both of the windings 4a and 4b, the second magnetic field would be smaller than the first magnetic field if similar size wires were used for both windings, since winding 4b has fewer turns than winding 4a and the amplitude of the pulses supplied to winding 4b would be less than the magnitude of the D-C signal supplied to the winding 4a. By selecting a wire size for winding 4b which presents less resistance, the current in winding 4b may be increased to the point at which the total ampere turns of winding 4b may be made to be twice the ampere turns of winding 4a, thereby providing maximum efficiency of operation.

It should be pointed out that although the two windings 4a and 4b have been shown as being separate from each other, the invention may be practiced with equal facility and results by using a single coil divided into two parts by an intermediate tapping point such as is shown in FIG. 4. The location of the tapping point for such a two-part field coil would be based upon the same considerations as those already mentioned. Again, the net effect of the pulses would be to create a second magnetic field which overcomes the first magnetic field for the duration of the pulses. For maximum efficiency, the second magnetic field would be twice as great as the first magnetic field.

Although the invention has been illustrated in connection with a unidirectional motor, it will be apparent that the principles may be applied to bidirectional motors with equal facility.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. A stepper motor comprising: a clawtooth stator including a plurality of angularly spaced poles and a field coil comprising first and second parts; a rotor having permanent magnetic poles angularly spaced the same number of degrees as said stator poles; means for connecting one end of each of said parts of said field coil to ground potential; means for applying a steady direct current to the free end of said first part of said field coil thereby establishing a first magnetic field due to said steady direct current; and means for applying a series of current pulses all of one polarity to the free end of said second part of said field coil, said current pulses having such amplitudes as to establish a second magnetic field for the duration of each of said pulses which is opposed to and has a greater strength than said first magnetic field.

2. The stepper motor of claim 1 in which said parts of said field coil comprise a different number of turns and both of said parts energize all of said angularly spaced poles to said stator.

3. The stepper motor of claim 1 in which said stator comprises a plurality of equally angularly spaced poles.

4. The stepper motor of claim 1 in which said part of said field coil comprises a greater number of turns than said second part, the product of said current pulses and the number of turns of said second part being greater than the product of said direct current and the number of turns of said first part and producing opposite magnetic polarity.

5. The stepper motor of claim 4 in which said first part comprises substantially twice as many turns as said second part and said current pulses applied to the free end of the second of said parts of said field coil have substantially the same amplitude as the magnitude of said direct current to establish a second magnetic field for the duration of said pulses which is opposed to and twice as great as said first magnetic field.

6. The stepper motor of claim 1 in which said two-part field coil is divided by a tap located at a predetermined turn of said field coil, means being provided to connect said tap to ground potential.

7. The stepper motor of claim 6 wherein said parts of said field coil are connected together at said tap, both of said parts linking all of said poles of said stator.

8. The stepper motor of claim 1 comprising in addition: a pair of pole assemblies disposed on either side of said field coil, each assembly having a first plurality of poles angularly spaced apart a pre-determined number of degrees, a non-magnetic metallic shading ring, and a magnetic metallic shaded pole member having a second plurality of poles angularly spaced apart said number of degrees; and means for connecting one end of each of said parts of said field coil to a reference potential.

9. The stepper motor of claim 8 in which said pair of pole assemblies comprises groups of poles with the poles in each group angularly spaced apart the same number of degrees.

References Cited

UNITED STATES PATENTS

| | | | |
|---|---|---|---|
| 2,864,018 | 12/1958 | Aeschmann | 310—163 |
| 2,981,855 | 4/1961 | Van Lieshout et al. | 310—163 |
| 3,014,141 | 12/1961 | Riggs | 310—156 |
| 3,040,223 | 6/1962 | Buhrendorf | 318—124 |
| 3,098,958 | 7/1963 | Katz | 318—138 |
| 3,238,399 | 3/1966 | Croymans et al. | 310—46 |

WARREN E. RAY, Primary Examiner

U.S. Cl. X.R.

310—49, 156, 257